US010257316B2

United States Patent
Melikyan (10) Patent No.: US 10,257,316 B2
(45) Date of Patent: Apr. 9, 2019

(54) MONITORING OF NODE.JS APPLICATIONS

(71) Applicant: AppDynamics LLC, San Francisco, CA (US)

(72) Inventor: Dmitri Melikyan, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 14/229,988

(22) Filed: Mar. 30, 2014

(65) Prior Publication Data

US 2015/0281035 A1    Oct. 1, 2015

(51) Int. Cl.

| G06F 9/46 | (2006.01) |
| H04L 29/06 | (2006.01) |
| G06F 1/32 | (2006.01) |
| H04L 29/08 | (2006.01) |
| G06F 9/00 | (2006.01) |
| G06F 11/34 | (2006.01) |

(52) U.S. Cl.
CPC .......... *H04L 67/42* (2013.01); *G06F 11/3466* (2013.01); *G06F 11/3409* (2013.01); *G06F 2201/815* (2013.01); *G06F 2201/86* (2013.01); *G06F 2201/865* (2013.01); *G06F 2201/87* (2013.01)

(58) Field of Classification Search
CPC ................................. H04L 67/42; H04L 67/00
USPC .......................................................... 709/224
See application file for complete search history.

(56) References Cited

U.S. PATENT DOCUMENTS

| 7,640,538 | B2* | 12/2009 | Bennett .................. G06Q 10/06 717/114 |
| 9,350,802 | B2* | 5/2016 | Maltbie ..................... H04L 67/06 |
| 9,363,334 | B2* | 6/2016 | Bar-Zeev .............. G06F 1/3203 |
| 2002/0062237 | A1* | 5/2002 | Matsumoto ............ G06Q 10/02 717/127 |
| 2005/0039171 | A1 | 2/2005 | Avakian et al. |
| 2005/0039186 | A1* | 2/2005 | Borkan ............... G06F 11/3476 719/310 |
| 2006/0075383 | A1* | 4/2006 | Moorthy ............... G06F 9/4484 717/106 |

(Continued)

OTHER PUBLICATIONS

PCT Application No. PCT/US2014/063574 International Search Report and Written Opinion dated Jan. 26, 2015.

(Continued)

*Primary Examiner* — Esther B. Henderson
*Assistant Examiner* — Golam Mahmud
(74) *Attorney, Agent, or Firm* — Behmke Innovation Group LLC; James Behmke; Stephen D. LeBarron (57) ABSTRACT

A system creates and monitors virtual threads within a node.js application. Callbacks executing within an event loop for a node.js system are identified and may be traced. The callbacks are associated with a context, and resources associated with execution flow during each context may be identified. Callback registrations, callback calls, and callback completion messages may each be detected and recorded. Each registration, call, and completion message is associated with a virtual thread or other transaction identifier. The timing information for each virtual thread and other resource usage for each context may then be identified, stitched together for distributed transactions and reported to a user to provide more detail for node.js application processing.

27 Claims, 7 Drawing Sheets

(56) References Cited

U.S. PATENT DOCUMENTS

| | | | |
|---|---|---|---|
| 2006/0122966 A1* | 6/2006 | Fecht | G06F 9/466 |
| 2006/0143525 A1* | 6/2006 | Kilian | G06F 9/505 |
| | | | 714/31 |
| 2006/0168199 A1 | 7/2006 | Chagoly et al. | |
| 2006/0271827 A1 | 11/2006 | Cascaval et al. | |
| 2007/0027742 A1* | 2/2007 | Emuchay | G06F 9/466 |
| | | | 705/7.27 |
| 2007/0038683 A1 | 2/2007 | Dixon et al. | |
| 2007/0233969 A1* | 10/2007 | Shukla | G06F 9/4881 |
| | | | 711/150 |
| 2008/0170622 A1* | 7/2008 | Gordon | H04N 21/23412 |
| | | | 375/240.18 |
| 2009/0037240 A1 | 2/2009 | Schmidt et al. | |
| 2009/0150908 A1 | 6/2009 | Shankaranarayanan et al. | |
| 2010/0088404 A1* | 4/2010 | Mani | H04L 67/125 |
| | | | 709/224 |
| 2010/0158109 A1* | 6/2010 | Dahlby | H04N 7/17318 |
| | | | 375/240.03 |
| 2011/0022707 A1* | 1/2011 | Bansal | H04L 67/22 |
| | | | 709/224 |
| 2012/0143643 A1 | 6/2012 | Gil et al. | |
| 2013/0036197 A1 | 2/2013 | Chan et al. | |
| 2013/0097440 A1* | 4/2013 | Bar-Zeev | G06F 1/3203 |
| | | | 713/320 |
| 2013/0170481 A1* | 7/2013 | Crawford | G01R 21/00 |
| | | | 370/338 |
| 2013/0179879 A1* | 7/2013 | Zhang | G06F 9/45533 |
| | | | 718/1 |
| 2014/0068003 A1 | 3/2014 | Bansal et al. | |

OTHER PUBLICATIONS

PCT/US14/063574, Monitoring of Node.js Applications, Oct. 31, 2014.

European Search Report dated Oct. 31, 2017 in connection with European Application 14887985.

Anonymous: "What are callbacks?"—docs.nodejitsu.com, Aug. 26, 2011, retrieved from the Internet: URL:https://docs.nodejitsu.com/articles/getting-started/control-flow/what-are-callbacks/: retrieved on Oct. 30, 2017.

* cited by examiner

MONITORING OF NODE.JS APPLICATIONS

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

One platform on which business services are provided over a network is node.js. Node.js is a software platform for scalable server side and networking applications. Node.js applications are written in Java script, and can be run with the node.js runtime on Windows, a Macintosh operating system, and Linux with no changes. Node.js applications maximize throughput and efficiency using non-blocking input output interfaces and asynchronous events and run on single threaded processes.

Unlike Java, node.js may process workflows using a single thread. Therefore, node.js applications cannot be monitored at the level of typical Java applications, which a processor may associate with different threads. What is needed is an improved method for monitoring node.js systems.

SUMMARY OF THE CLAIMED INVENTION

The present technology provides a system for creating and monitoring virtual threads within a node.js application. Callbacks executing within an event loop for a node.js system are identified and may be traced. The callbacks are associated with a context, and resources associated with execution flow during each context may be identified. Callback registrations, callback calls, and callback completion messages may each be detected and recorded. Each registration, call, and completion message is associated with a virtual thread or other transaction identifier. The timing information for each virtual thread and other resource usage for each context may then be identified, stitched together for distributed transactions and reported to a user to provide more detail for node.js application processing.

An embodiment may include a method for monitoring a business transaction. A workflow function may be detected on an application server. A context associated with the workflow function may be set. The workflow on the application server and associated with the workflow function may be monitored. Performance data associated with the context may be stored.

An embodiment may include a system for monitoring a business transaction. The system may include a processor, a memory and one or more modules stored in memory and executable by the processor. When executed, the one or more modules may detect a workflow function on an application server, set a context associated with the workflow function, monitor the workflow on the application server associated with the workflow function, and store performance data associated with the context.

DETAILED DESCRIPTION

A system is provided for creating and monitoring virtual threads within a node.js application. Callbacks executing within an event loop for a node.js system are identified and may be traced. The callbacks are associated with a context, and resources associated with execution flow during each context may be identified. Callback registrations, callback calls, and callback completion messages may each be detected and recorded. Each registration, call, and completion message is associated with a virtual thread or other transaction identifier. The timing information for each virtual thread and other resource usage for each context may then be identified, stitched together for distributed transactions and reported to a user to provide more detail for node.js application processing.

Figure 1:
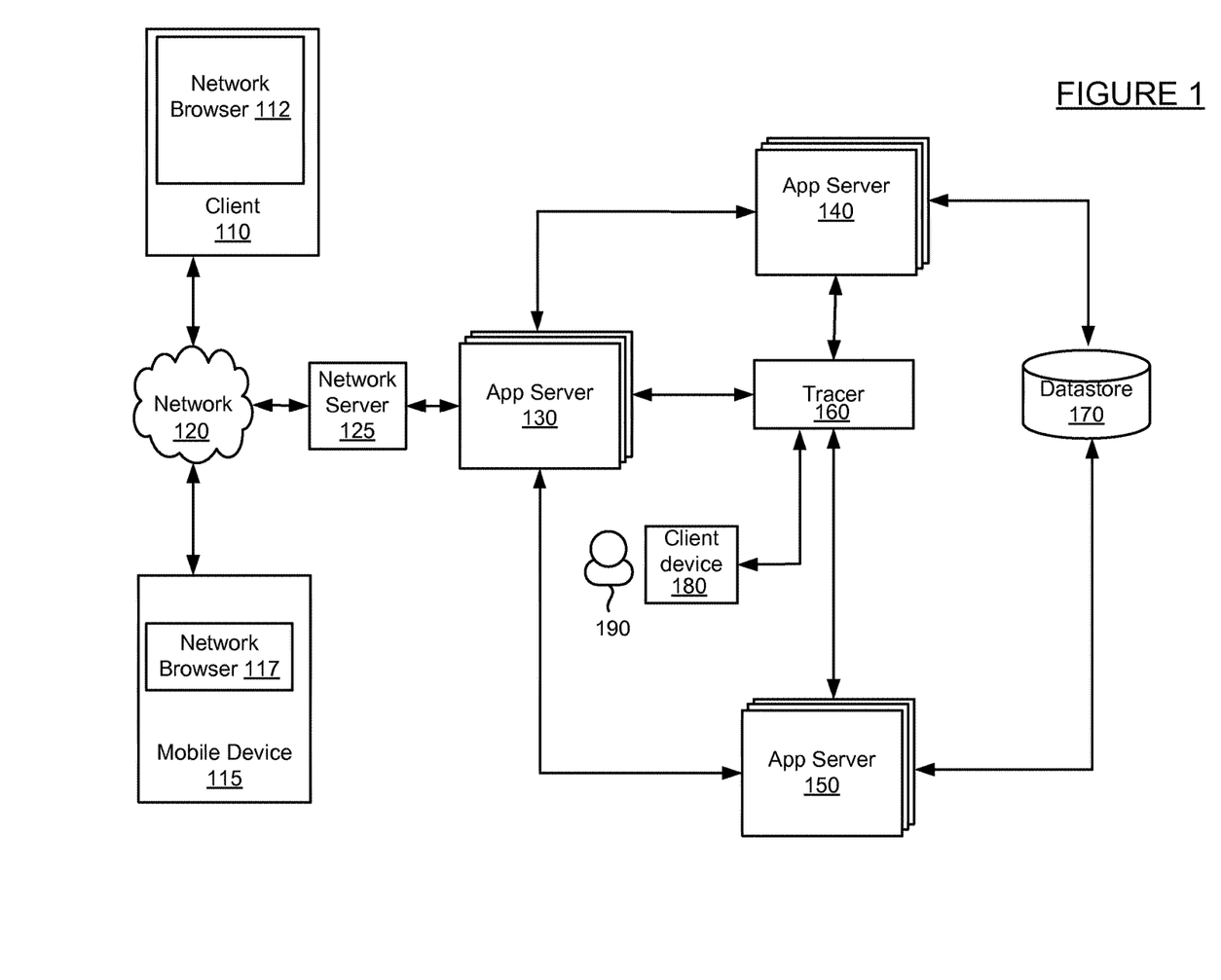
FIG. 1 illustrates a system for monitoring a node.js system.

FIG. 1 illustrates a block diagram of a system for monitoring a node.js application. The system of FIG. 1 may include client 110, mobile device 115, network 120, network server 125, application servers 130, 140 and 150, tracer 160, database 170, and client device 180.

Client 110 may include any device through which a user may initiate a request over network 120 to servers 130-140. Client device 110 may include network browser 110 and be implemented as a computing device, such as for example a laptop, desktop, workstation, or some other computing device. Network browser 112 may be a client application for sending requests and queries to an application server such as application server 130, as well as viewing content provided by an application server. Client device 110 may include hardware and/or software configured to access a web service provided by network server 125.

Mobile device 115 may be implemented as a portable device, such as for example a mobile phone, smart phone, tablet computer or other portable device. Mobile device 115 may include network browser 117, which may include a client application for viewing content provided by an application server, such as application server 130 via network server 125 over network 120

Network 120 may be used to receive and process communications, including requests and responses, between client 110, mobile device 115 and network server 125. In some embodiments, network 120 may also exist between other machines of FIG. 1, such as for example between application servers 130, 140 and 150, between application servers and data store 170, as well as other machines. Network 120 may include any public or private network for communicating data, such as for example a local area network, a wide area network, the internet, an intranet, a wireless network, a cellular network, or a combination of these networks.

Network server 125 may receive and process requests received from client 110 and mobile device 115 over network 120. Network server 125 may be implemented by the same machine or a different machine as application server 130. In some embodiments, a network server 125 may be an actual device or a logical device that processes requests and forwards requests or generates new requests to application server 130 to be serviced and returned to client 110 or mobile device 115.

Application server 130 may communicate with network server 125, application servers 140 and 150, datastore 170, and may include one or more applications 142. Application server 140 may be implemented on the same machine or a different machine as network server 130.

Application server 130 may include one or more node.js applications. The node.js application may be written in Java script and run on a Windows, Apple operating system (OS), or a Linux OS. Application server 130 may also include monitoring components which identify application functions and trace application functions which execute as part of the execution flow in the node.js platform. More detail for application server 130 is discussed below with respect to the block diagram of FIG. 2.

Application servers 140 and 150 may communicate with each other, application server 130, data store 170, network server 125, and tracer 160. Each of application servers 140 and 150 may include one or more node.js applications and monitoring components similar to application server 130. Application servers 130-150 may process distributed business transactions that involve node.js applications on one or more of servers 130-150.

Tracer 160 may be used to trace application functions of node.js applications. Tracer application 160 may receive information from monitoring components installed on an application of application server 130, 140 and 150. Tracer 160 may receive event information and transaction identifiers from application monitoring components, stitch the information and transaction identifiers together to determine virtual threads and runtime data for each virtual thread (contextual information), and report that data to a user. The data may be reported in any of several typical reporting methods, including alerts, email messages, SMS messages, and via a web-based interface viewable by client device 180.

Data store 170 may receive requests from application servers 130-150, process the request, and transmit a response to the requesting server.

Figure 2:
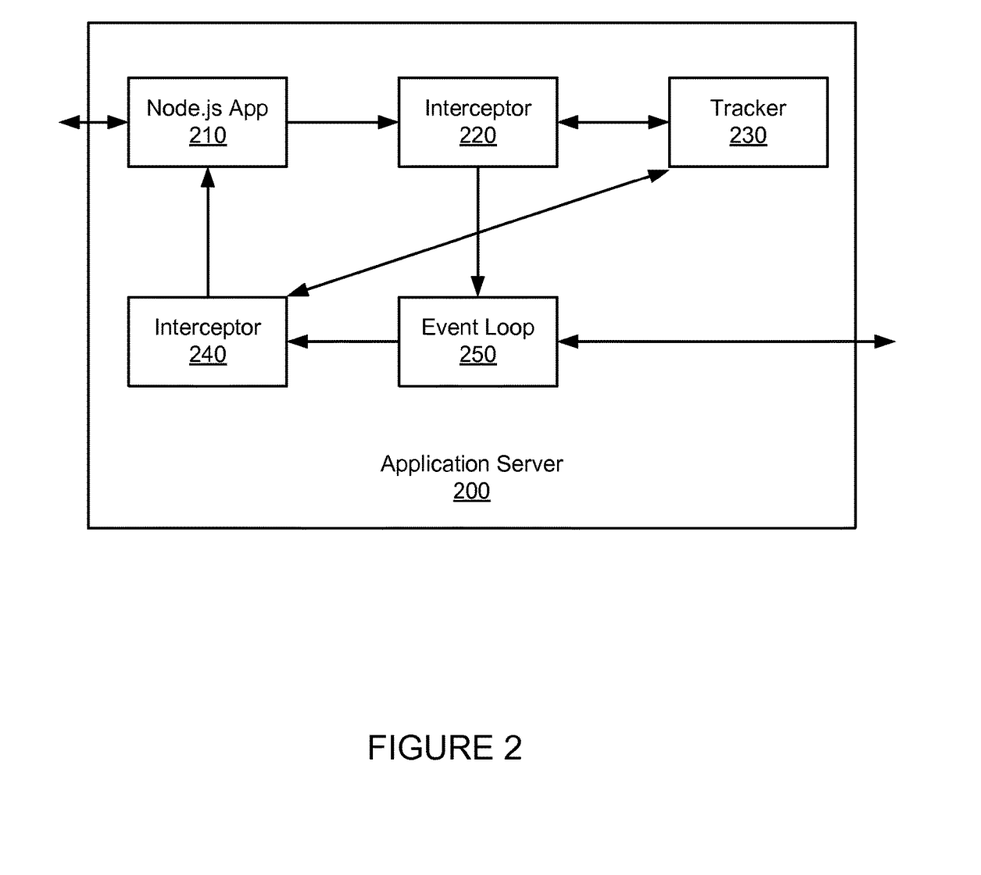
FIG. 2 is a block diagram of an application executing a node.js application.

FIG. 2 illustrates a node.js application within application server 200. The application server of FIG. 2 provides additional detail for each of application servers 130-150 of FIG. 1. Application server 200 includes node.js application 210, interceptor 220, tracker 230, interceptor 240, and event loop 240. Node.js application 210 on application server 200 may receive a request from an external source, such as a remote computing device. As part of the request, application 210 will eventually send a message to event loop 250 for the request to be processed. Event loop 250 may process the request and optionally make additional requests, such as for example to database 170.

Interceptor 220 is positioned between application 210 and event loop 250 to intercept execution flow occurring between the node.js application 210 and the event loop 250. Interceptor 220 may intercept execution flow such as callback registrations, callback calls, and other execution flow. When intercepting execution flow, interceptor 220 may query tracker 230 to determine if a particular execution flow message is currently associated with a transaction ID. For example, if interceptor 220 intercepts a callback registration, interceptor 220 may determine from tracker 230 that no transaction ID is be associated with the callback registration, will create a transaction ID, and send the transaction ID to tracker 230. If a callback call is intercepted by 220, interceptor 220 will confirm that the callback is associated with a transaction ID and indicate to tracker 230 that a call for the transaction ID associated with that callback has been received.

After intercepting execution flow from application 210, interceptor 220 will forward the execution flow to event loop 250. Event loop 250 transmits requests based on the execution flow to outside services, such as database 170. Once the external request has been processed by a component outside the application server, a response will be received from the component by event loop 250.

When the callback processing is done, for example after receiving a message from database 170, event loop 250 will inform node.js application 210 that the callback has completed. Interceptor 240 may intercept information sent from event loop 250 to node.js application 210. Upon receiving a notification that the callback is complete, interceptor 240 will inform tracker 230 that the callback is complete. Upon receiving this information, tracker 230 will change the current contextual state to a different state. For example, upon receiving the callback registration notice, tracker 230 may set a contextual state to be switched upon receiving the callback call. Upon receiving the callback call, interceptor 200 informs tracker 230 and 230 actively sets the contextual state to a particular value associated with the call. This contextual state may be considered the "virtual thread" value. The contextual state is then switched to the next virtual thread value, a previous virtual thread value, or a value of null after the callback has completed.

Figure 3:
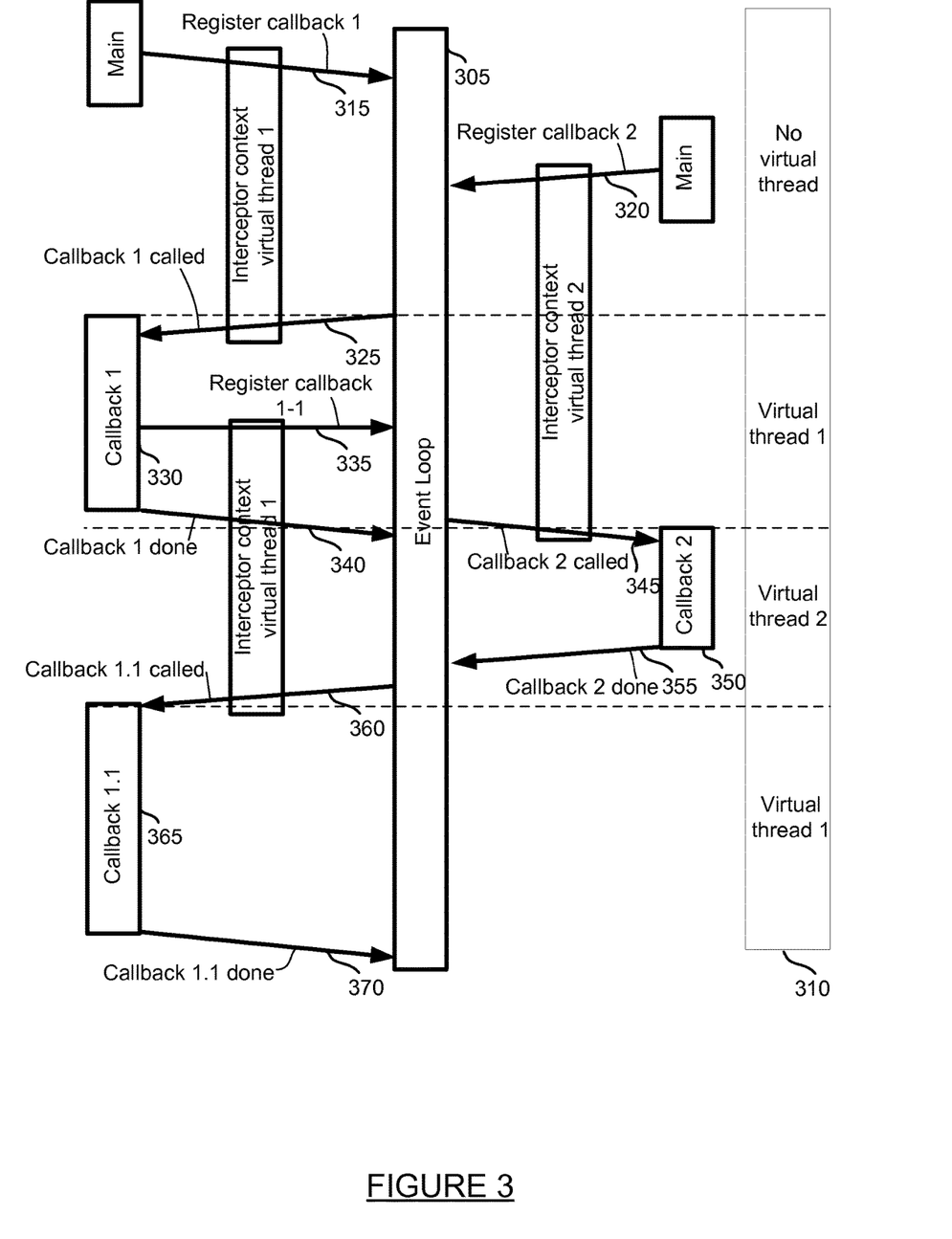
FIG. 3 illustrates a timing diagram for the present technology.

FIG. 3 illustrates a timing diagram for monitoring a node.js application using the present technology. The timing diagram of FIG. 3 includes event loop 305 and virtual thread tracker 310. A first callback registration is received by the event loop at step 315. As shown, an interceptor may intercept the callback registration and set an interceptor context as a virtual thread 1. A second callback registration may be received at step 320. This creates an interceptor context virtual thread of a value 2. An interceptor may then intercept a callback call associated with the first callback at step 325. At this point, the first callback begins to execute and a virtual thread is set to a value of 1. A second callback may be registered during the first virtual thread at step 335 and a message that the first callback is complete may be intercepted at step 340. After completing the first callback, a call for the second callback may be detected at step 345. At this point, the second virtual thread value is set until the callback is completed at step 355. After completing the second callback, the second portion of the first callback is set at step 360 at which time the virtual thread is set to a virtual state of the first virtual thread value. This state continues until the first callback completes at step 370.

Figure 4:
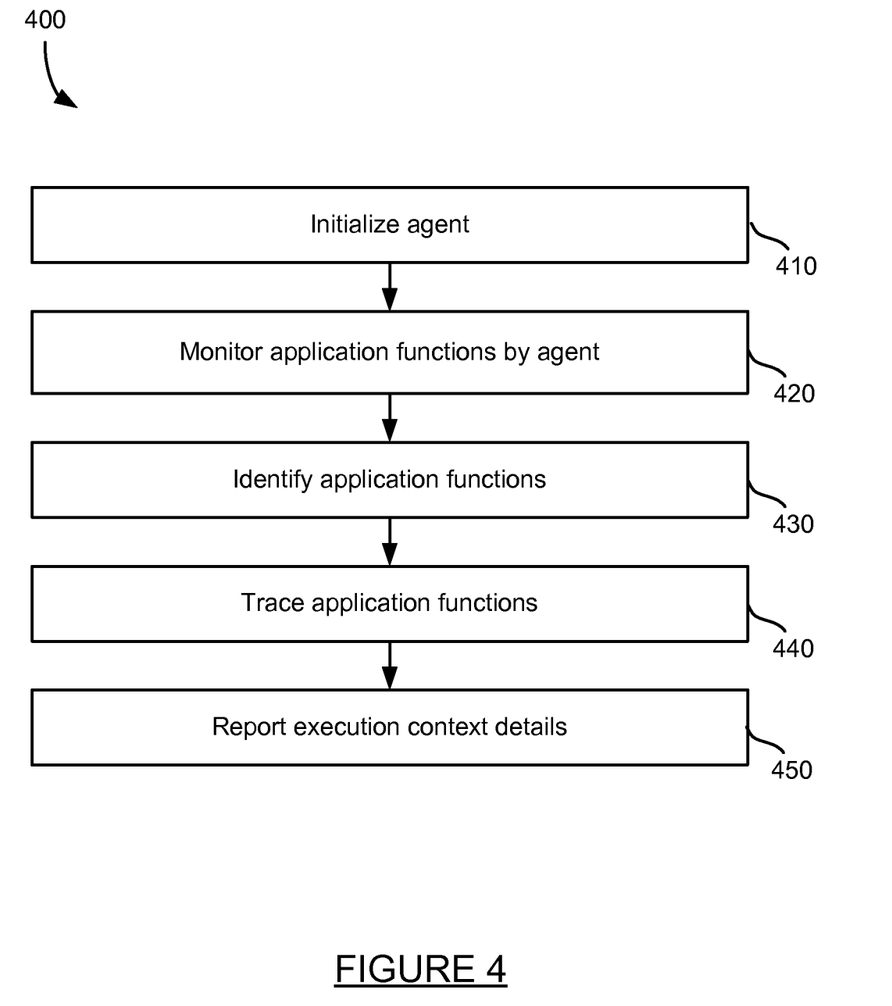
FIG. 4 illustrates a method for monitoring a node.js application.

FIG. 4 is a method for monitoring a node.js application. First, an agent is initialized at step 410. The agent may include interceptors, a tracker, and optionally other components within an application server to monitor a node.js application within the application server. Application functions may then be monitored by the agent components at step 420. Referring to FIG. 2, interceptors 220 and 240 may intercept communications between application 210 and event loop 250 as part of the monitoring. Application functions are identified at step 430. Application functions may be associated with callbacks initiated by the application and processed by the event loop. The functions may include callback registrations, callback calls, and callback completions. The functions may include workflow functions such associated with a portion of a business transaction, i.e. an entry point, HTTP request, a related backend call such as a MySQL call. More detail for identifying application functions is discussed with respect to the method of FIG. 5.

Application functions may be traced at step 440. After the application functions have been identified, the resources associated with carrying out the functions are traced and stitched together by a tracer component. More detail for tracing application functions is discussed with respect to the method of FIG. 6. After tracing the application functions, the tracing data may be reported at step 450. A tracer may piece together portions of the execution context. The tracer has knowledge of the transaction start and each event start as part of the same execution context, and may report them through a web based interface. The components of the transaction may be reported in terms of a virtual thread that handles each call.

Figure 5:
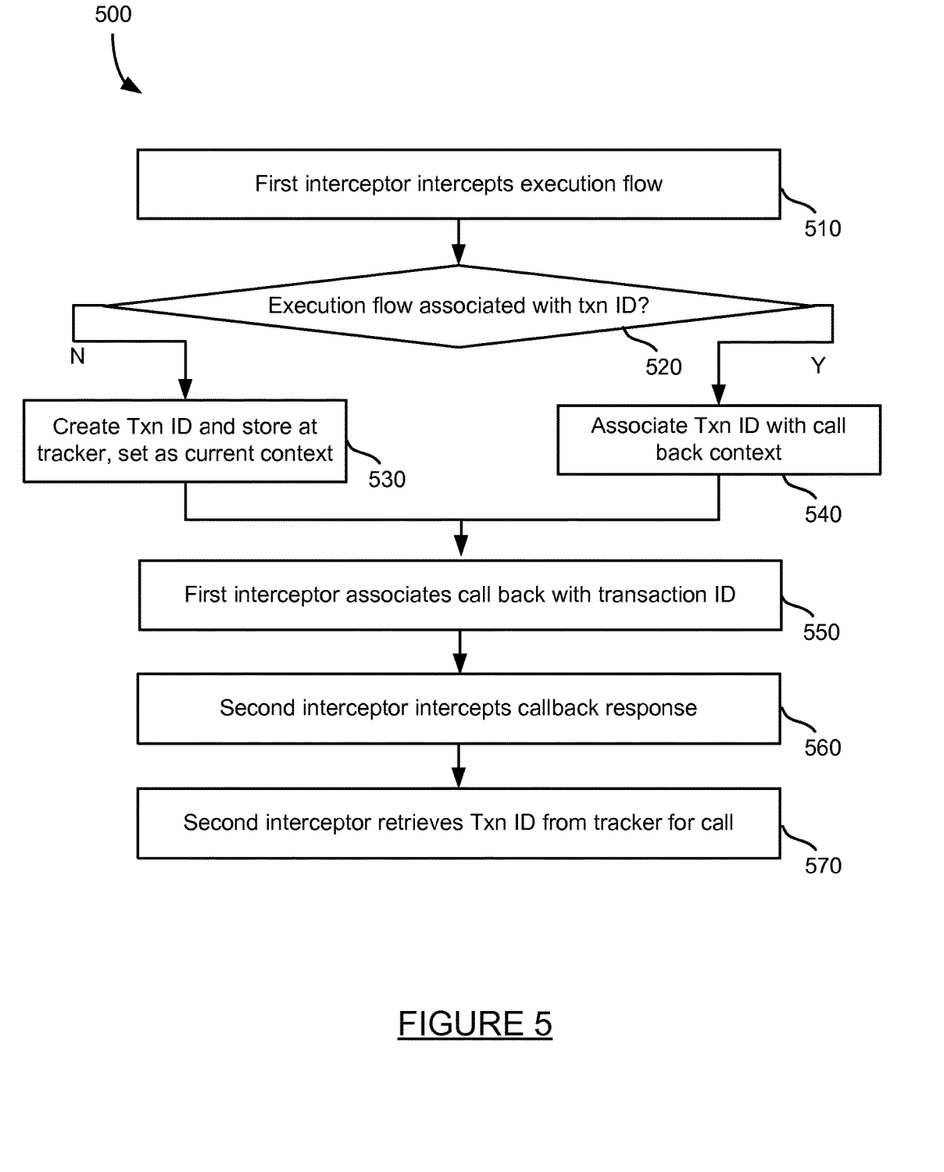
FIG. 5 illustrates a method for identifying application functions.

FIG. 5 is a method for identifying application functions. An interceptor intercepts an execution flow by an agent at step 510. The execution flow may include a message transmitted from the application to the event flow and intercepted by an interceptor. A determination is then made as to whether the execution flow and intercepted portion are associated with a transaction identifier at step 520. In some embodiments, the interceptor may query a tracker to determine if a callback which was intercepted is associated with a transaction identifier by the tracker. If no transaction identifier is stored at the tracker for the particular callback, a transaction identifier is created by the interceptor and provided to the tracker at step 530. In some embodiments, the transaction identifier is created by the tracker and provided to the identifier in response to the transaction ID query from the interceptor. If no transaction ID is associated with the callback received as part of the execution flow, the intercepted execution flow is a callback registration. If the intercepted execution flow is associated with a transaction ID, the intercepted execution flow is determined to be a callback call and the call is registered with the tracker at step 540. When a callback call is received, a virtual thread value may be set to a particular state associated with the transaction ID.

The interceptor associates the callback with the transaction ID at step 550. At this point, the callback information is forwarded to an event loop which then carries out the transaction. Upon determining that the transaction is complete, the event loop will communicate this to the application. The callback complete message is intercepted at step 560. The interceptor retrieves the transaction identifier at step 570. The callback interceptor may retrieve the transaction identifier from the javascript context, where the transaction id is stored by the call registration interceptor, and uses it for passing to the tracer as well as sets back to the tracker, thus making it a current virtual thread ID.

Figure 6:
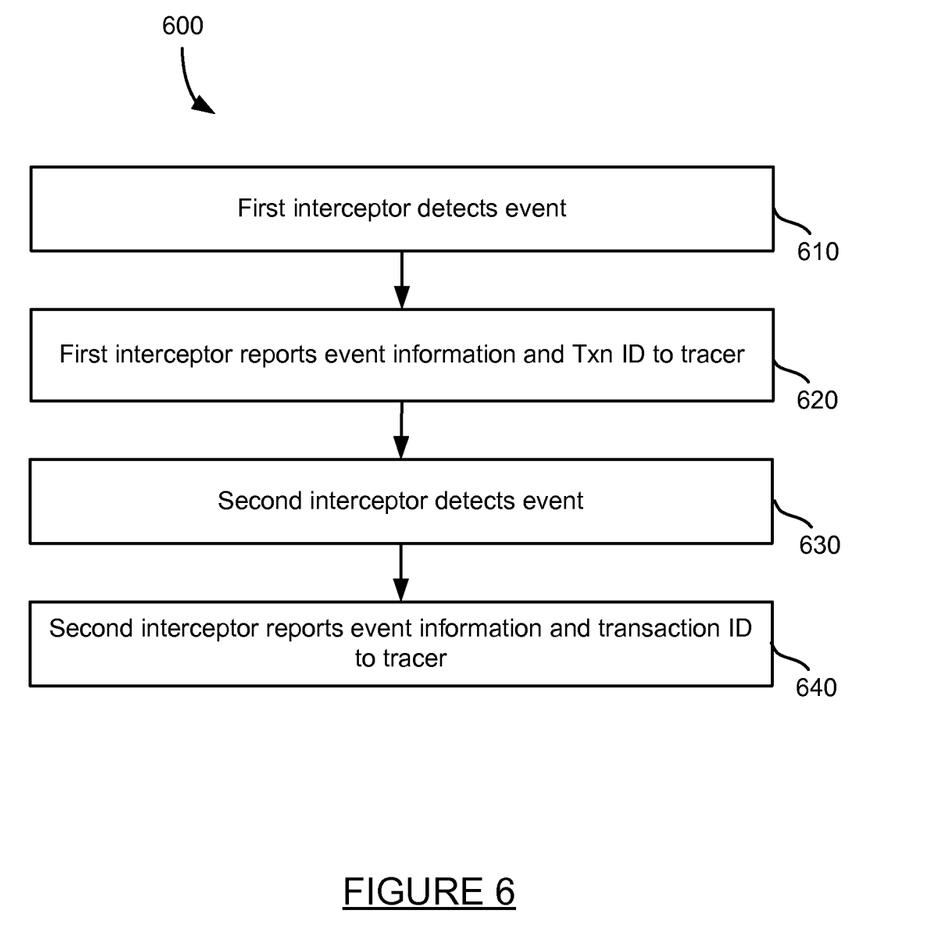
FIG. 6 illustrates a method for tracing application functions.

FIG. 6 is a method for tracing application functions. First, an event is detected at step 610. The event may include detecting a callback call which is processed as part of the application identification process. After detecting an event, the interceptor reports the event information and a transaction identifier to a tracer at step 620. The event information may include an http request, an IP address for a database, or a MySQL query. The event information may include database and http calls as well as file system access requests. The completion of the event may be detected at step 630 and the event information and transaction identifier for the completed event are transmitted to the tracer at step 640.

Figure 7:
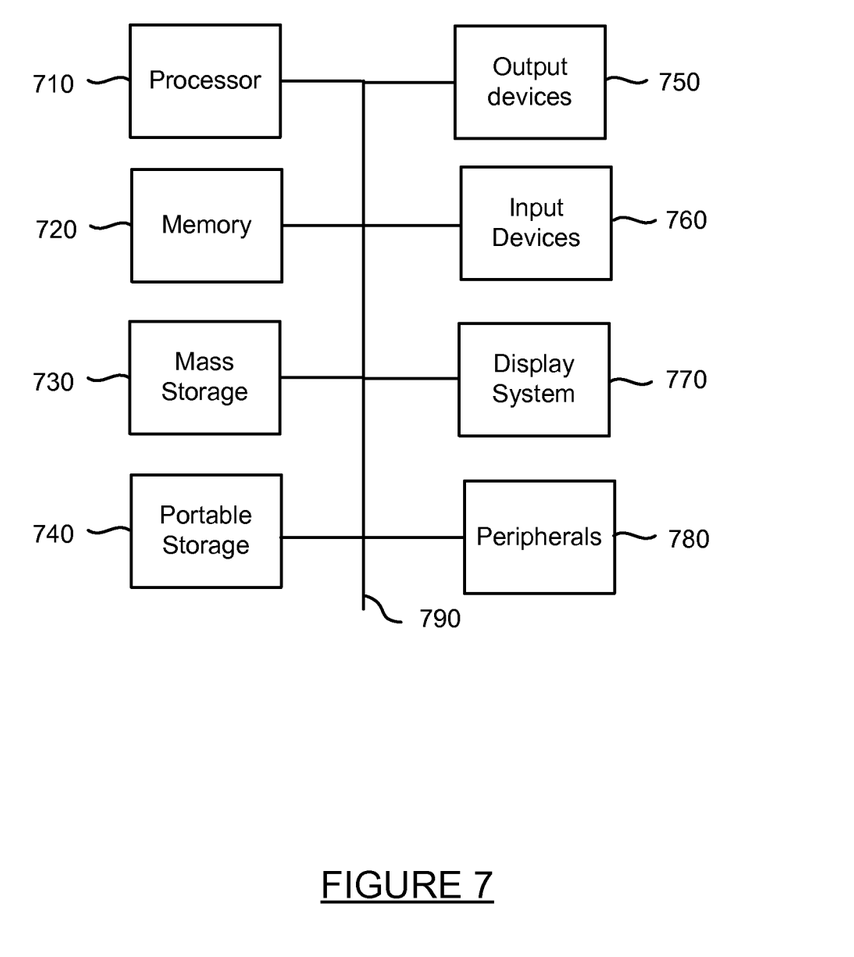
FIG. 7 provides a block diagram of a computing environment for implementing the present technology.

FIG. 7 is a block diagram of a computer system for implementing the present technology. System 700 of FIG. 7 may be implemented in the contexts of the likes of client 110, network server 125, application servers 130, 140 and 150, tracer 160, data store 170, and client device 180. A system similar to that in FIG. 7 may be used to implement a mobile device able to communicate wirelessly, such as a smart phone or tablet computer, but may include additional components such as an antennas and radios, additional microphones, and other components typically found in mobile devices such as a smart phone or tablet computer.

The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction in a node.js application, the method comprising:
   detecting a plurality of application functions associated with a business transaction in the node.js application, the application functions associated with callback registrations, callback calls, and callback completions on an application server;
   assigning a transaction identifier to each callback registrations not already associated with a transaction identifier of the business transaction;
   setting and updating a contextual state for the application functions based on the detection of the callback registrations, callback calls and callback completions;
   using the transaction identifier, tracing the application functions including resources associated with carrying out the application functions;
   collecting runtime data indicative of performance of the business transaction associated with the traced application functions;
   storing the runtime data indicative of the performance of the business transaction associated with the traced application functions;
   receiving event information at a tracer module; and
   stitching together the resources associated with carrying out the traced application functions associated with the node.js application by stitching together the event information and the assigned transaction identifier to determine a virtual thread and runtime data for each virtual thread associated with the node.js application.

2. The method of claim 1, wherein setting and updating a contextual state include:
   setting an initial contextual state to a virtual thread value for each callback registration;
   changing the initially set contextual state to a different virtual thread value associated with each callback call when each callback call is detected; and
   changing the virtual thread value of the contextual state associated with each callback call to a different virtual thread associated with each callback completion when each callback completion is detected.

3. The method of 1, wherein the application functions include an entry point, HTTP request, or a related backend call.

4. The method of 1, wherein the application functions are detected by intercepting the callbackregistrations.

5. The method of 1, wherein the event information is reported upon detecting a callback call.

6. The method of 1, wherein the event information is reported upon detecting a callback completion.

7. The method of claim 1, wherein detecting the application functions include detecting messages associated with the application functions.

8. The method of claim 1, wherein setting and updating a contextual state for the application functions include:
   setting the contextual state to a particular state associated with the transaction identifier of each application function.

9. The method of claim 1, wherein the application functions are performed by a single virtual thread; and
   switching the single virtual thread to a virtual state of a virtual thread value associated with each application function as the single virtual thread performs at least a portion of each application function.

10. A non-transitory computer readable storage medium having embodied thereon a program, the program being executable by a processor to perform operations for monitoring a business transaction in a node.js application, the operations including:
    detecting a plurality of application functions associated with a business transaction in the node.js application, the application functions associated with callback registrations, callback calls, and callback completions on an application server;
    assigning a transaction identifier to each callback registrations not already associated with a transaction identifier of the business transaction;
    setting and updating a contextual state for the application functions based on the detection of the callback registrations, callback calls and callback completions;
    using the transaction identifier, tracing the application functions including resources associated with carrying out the application functions;
    collecting runtime data indicative of performance of the business transaction associated with the traced application functions;
    storing the runtime data indicative of the performance of the business transaction associated with the traced application functions;
    receiving event information at a tracer module; and
    stitching together the resources associated with carrying out the traced application functions associated with the node.js application by stitching together the event information and the assigned transaction identifier to determine a virtual thread and runtime data for each virtual thread associated with the node.js application.

11. The non-transitory computer readable storage medium of claim 10, wherein setting and updating a contextual state include:
    setting an initial contextual state to a virtual thread value for each callback registration;
    changing the initially set contextual state to a different virtual thread value associated with each callback call when each callback call is detected; and
    changing the virtual thread value of the contextual state associated with each callback call to a different virtual thread associated with each callback completion when each callback completion is detected.

12. The non-transitory computer readable storage medium of 10, wherein the application functions include an entry point, HTTP request, or a related backend call.

13. The non-transitory computer readable storage medium of 10, wherein the application functions are detected by intercepting the callback registrations.

14. The non-transitory computer readable storage medium of 10, wherein the event information is reported upon detecting a callback call.

15. The non-transitory computer readable storage medium of 10, wherein the event information is reported upon detecting a callback completion.

16. The non-transitory computer readable storage medium of claim 10, wherein detecting the application functions include detecting messages associated with the application functions.

17. The non-transitory computer readable storage medium of claim 10, wherein setting and updating a contextual state for the application functions include:
setting the contextual state to a particular state associated with the transaction identifier of each application function.

18. The non-transitory computer readable storage medium of claim 10, wherein the application functions are performed by a single virtual thread; and
switching the single virtual thread to a virtual state of a virtual thread value associated with each application function as the single virtual thread performs at least a portion of each application function.

19. A system for monitoring a business transaction, comprising:
an application server including one or more processors and memory; and
one or more modules stored in memory and executable by at least one of the one or more processors to monitor a business transaction in a node.js application including:
detect a plurality of application functions associated with a business transaction in the node.js application, the application functions associated with callback registrations, callback calls, and callback completions on an application server;
assign a transaction identifier to each callback registrations not already associated with a transaction identifier of the business transaction;
set and updating a contextual state for the application functions based on the detection of the callback registrations, callback calls and callback completions;
use the transaction identifier to trace the application functions including resources associated with carrying out the application functions;
collect runtime data indicative of performance of the business transaction associated with the traced application functions;
store the runtime data indicative of the performance of the business transaction associated with the traced application functions;
receive event information at a tracer module; and
stitch together the resources associated with carrying out the traced application functions associated with the node.js application by stitching together the event information and the assigned transaction identifier to determine a virtual thread and runtime data for each virtual thread associated with the node.js application.

20. The system of claim 19, wherein the one or more modules stored in memory are executable by at least one of the one or more processors to set and update the contextual state including:
set an initial contextual state to a virtual thread value for each callback registration;
change the initially set contextual state to a different virtual thread value associated with each callback call when each callback call is detected; and
change the virtual thread value of the contextual state associated with each callback call to a different virtual thread associated with each callback completion when each callback completion is detected.

21. The system of 19, wherein the application functions include an entry point, HTTP request, or a related backend call.

22. The system of 19, wherein the one or more modules stored in memory and executable by at least one of the one or more processors to detect the application functions by intercepting the callback registrations.

23. The system of 19, wherein the one or more modules stored in memory are executable by at least one of the one or more processors to report the event information upon detecting a callback call.

24. The system of 19, wherein the one or more modules stored in memory are executable by at least one of the one or more processors to report the event information upon detecting a callback completion.

25. The system of claim 19, wherein the one or more modules stored in memory are executable by at least one of the one or more processors to detect the application functions including detect messages associated with the application functions.

26. The system medium of claim 19, wherein the one or more modules stored in memory are executable by at least one of the one or more processors to set and update a contextual state for the application functions including:
setting the contextual state to a particular state associated with the transaction identifier of each application function.

27. The system of claim 19, wherein the application functions are performed by a single virtual thread; and
switch the single virtual thread to a virtual state of a virtual thread value associated with each application function as the single virtual thread performs at least a portion of each application function.

* * * * *